United States Patent [19]

Walker

[11] Patent Number: 5,697,183
[45] Date of Patent: Dec. 16, 1997

[54] FISHING ROD HOLDING DEVICE

[75] Inventor: Michael E. Walker, Mill Creek, Wash.

[73] Assignee: Sound Inventions, Inc., Mill Creek, Wash.

[21] Appl. No.: 499,382

[22] Filed: Jul. 7, 1995

[51] Int. Cl.$^6$ .................................................. A01K 97/10
[52] U.S. Cl. ................................................. 43/21.2; 224/922
[58] Field of Search ................................. 43/21.2; 224/922

[56] References Cited

U.S. PATENT DOCUMENTS

| | | | |
|---|---|---|---|
| 1,764,852 | 6/1930 | Phillips . | |
| 2,724,569 | 11/1955 | Licata | 248/42 |
| 2,781,958 | 2/1957 | Lewandowski | 224/922 |
| 2,803,839 | 8/1957 | Mosley | 9/11 |
| 2,973,125 | 2/1961 | Parry | 224/922 |
| 2,995,855 | 8/1961 | Bell | 43/21.2 |
| 2,998,613 | 9/1961 | Lynn et al. | 9/347 |
| 3,282,482 | 11/1966 | Scharsu | 224/922 |
| 3,748,672 | 7/1973 | Patrick et al. | 9/347 |
| 3,749,294 | 7/1973 | Johnston | 224/922 |
| 3,750,918 | 8/1973 | Jensen | 224/922 |
| 3,874,573 | 4/1975 | Fruscella et al. | 224/5 |
| 3,917,134 | 11/1975 | Tumlinson | 224/922 |
| 4,030,151 | 6/1977 | McKeen, Jr. | 9/1.7 |
| 4,529,112 | 7/1985 | Miller | 43/21.2 |
| 4,624,069 | 11/1986 | Schneider | 43/21.2 |
| 4,827,654 | 5/1989 | Roberts | 43/21.2 |
| 4,861,301 | 8/1989 | Pomeroy et al. | 441/131 |
| 5,052,146 | 10/1991 | Resnick | 43/21.2 |
| 5,190,194 | 3/1993 | Rosner et al. | 224/0.5 |
| 5,230,646 | 7/1993 | Thorup | 441/131 |
| 5,446,989 | 9/1995 | Stange | 43/21.2 |

*Primary Examiner*—Kurt Rowan
*Attorney, Agent, or Firm*—Dowrey & Associates

[57] ABSTRACT

A fishing rod holding device adaptable to either a fly rod, spinning rod or bait casting rod, with attachment means for use with an inflatable fisherman's flotation device. The holding device supports the rod securely in an upright position, clear of the waterline, allowing the fisherman free use of his hands to remove hooks or other tasks.

21 Claims, 3 Drawing Sheets

5,697,183

1

FISHING ROD HOLDING DEVICE

BACKGROUND OF THE INVENTION

1. Field of the Invention

The present invention relates to a fishing rod holding device for supporting a fishing rod and reel in an upright position clear of the waterline on an inflatable fisherman's float or the like. Flotation devices, usually comprising an inflatable inner tube with a specifically adapted outer sleeve, are used to support a fisherman in a seated position in a body of water. Such devices are basic and generally provide little by way of amenities except for a seat, formed by a cross web or the like, and additional padding carried on the sleeve. Sport fishing requires a substantial amount of diverse equipment, such as hook removers, nets, bait and lures, and in some instances, may include more than one type of rod and reel. The present invention provides a method and apparatus for conveniently storing fishing rods of different configurations on one of these devices to allow the fisherman to divert his attention for removing a hook from a fish, or some similar task and also to store additional rods for alternate use.

2. Description of the Prior Art

Fishing rod holding devices have been known in the art for some time. U.S. Pat. No. 3,974,573 to Fruscella et al and U.S. Pat. No. 5,052,146 to Resnick are examples of fishing rod holding devices adapted to be attached to the body of the fisherman by means of a belt or the like. U.S. Pat. No. 2,724,569 to Licata discloses a fishing rod holding device of the type designed to be implanted in the ground.

Sport fishing using a flotation device carried by an inflated inner tube has become popularized with the advent of specially designed sleeves that conform to a conventional tire inner tube. These devices usually provide leg holes located in the center area of the tube so that the fisherman is supported in an upright position. The device may also incorporate inflatable back supports and other features specially adapted to the needs of fishermen. A drawback of such devices, however, is that there is no convenient way to store a fishing pole on the limited space available on an inner tube, or for storing additional poles. Normally, the rod will be stored by laying it across the tube in front of the fisherman where it presents an obstacle, and can easily be bumped and fall into the water. U.S. Pat. No. 4,624,069 to Schneider addresses this problem with a pivotally mounted rod holder suitable for use with an inner tube. The Schneider device, as near as can be ascertained from the disclosure, holds a rod at and below the waterline, so that the rod and reel are likely to get wet. Additionally, the Schneider device requires a folding flap to hold the rod and reel in place.

SUMMARY OF THE INVENTION

The present invention provides a holder for securing a fishing rod or similar item to the inflated tube of a flotation device. The rod holder can be mounted at any point on the tube at which conventional securing means can encircle a segment of the tube. The securing means can comprise any conventional attachment device, such as a strap, belt or web of nylon or the like with a buckle or velcro type of fastener.

The holder may comprise a plastic tube of such material as polyvinylchloride (PVC) or the like having an inside diameter slightly larger than the outside diameter of a fishing pole handle. The tube, however, may be made of any suitable plastic and formed by injection molding or any other suitable process. In its broadest sense the present invention is not limited to any specific material or method of manufacture. The overall length of the tube may be approximately 12 inches with a generally transverse slot cut near the mid point of the tube length. The transverse slot may be arcuate and have a lower edge cut at an angle with the tube wall of approximately 40° for reasons to be described and will be sufficiently wide to accommodate the fastening web or strap. A similar slot or notch may be cut at the bottom of the tube to accommodate the other end of the fastening strap. In this way, the fastening means traverses approximately the lower half of the inside wall of the tube while encircling a segment of the inner tube and thereby fixes the device against the tube wall substantially vertically with respect to the water. A vertical slot is located in the wall of the tube diametrically opposite from the transverse slot for the purpose of receiving the stem or attachment means between the fishing rod and reel. The vertical slot is flared at the top and extends downwardly from the top edge of the tube over a predetermined portion of the upper half of the tube. The slot serves to prevent rotation of the rod and reel carried in the tube.

The rod holding device is so constructed that the handle of a fly rod, spinning rod or bait casting rod can be slid downwardly, butt first into the tube, with the flared groove accepting the stem or attaching means of the reel. The handle or butt end portion of the rod engages all or a portion of the tube traversed by the attachment strap so as to form a friction lock that serves to hold the rod securely in place. Thus, the rod and reel is held from rotation and frictionally restrained from movement out of the tube. If desired, an additional segmented rotatable lock ring may be carried on the upper end of the tube in a position to close the slot at the upper flared end thereof. An extended upper portion of the tube is designed to engage at least a portion of the forward grip of the rod which, in the case of a conventional fly rod, provides an essential holding surface.

DESCRIPTION OF THE PREFERRED EMBODIMENT

Figure 1:
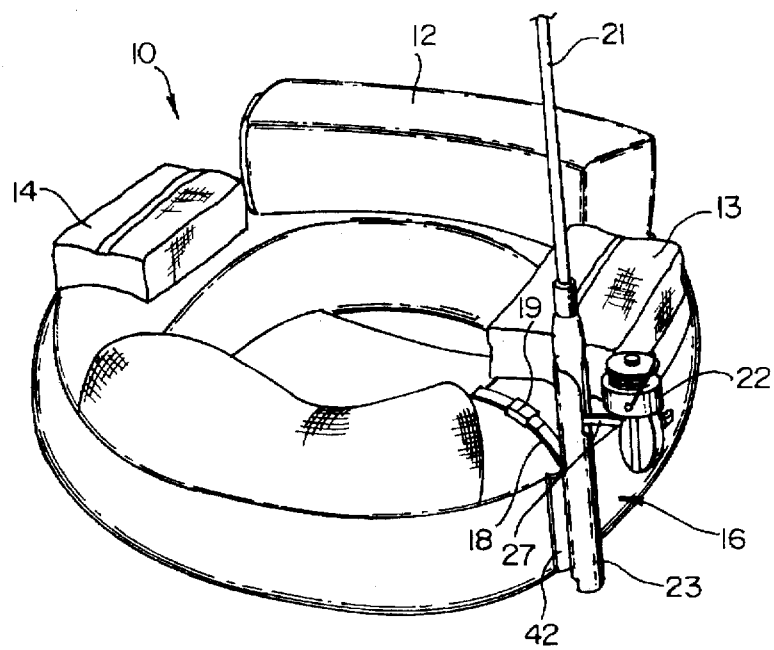
FIG. 1 is a perspective view of the fishing rod holder mounted on a flotation device.
Figure 2:
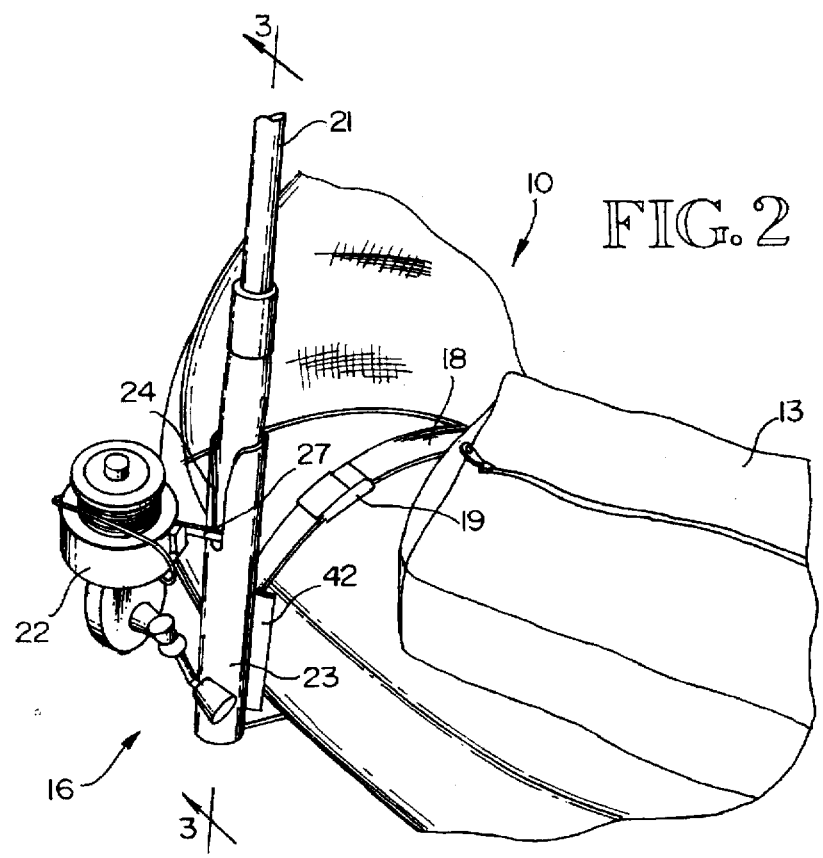
FIG. 2 is a perspective view of the fishing rod holder with a spinning reel and rod in stored position.

FIG. 1 illustrates one conventional type of flotation device 10 wherein an inflatable tube, such as a tire inner tube, is contained within a canvas enclosure or the like which surrounds the tube and may be provided with a cross member 11 having leg holes (not shown). The cross member provides a seat for the fisherman who sits on the cross member 11 with his legs through the holes in the cross member and his back against a seat or cushion 12. Additionally, arm rests 13 and 14 may be provided on the surface of the cover which may also comprise zipper-closed storage compartments or the like. The rod holder indicated generally at 16 is mounted or attached by a suitable attaching means which, in the present embodiment, comprises the flexible strap 18. The strap surrounds the wall of the tube of the flotation device, extends through the fishing rod holder and is adjusted by means of a buckle or the like 19. As shown in FIGS. 1 and 2, the fishing rod holder maintains the rod 21 and spinning reel 22 in a vertical fixed position near the top side of the flotation device and well out of the water. Although only one such rod holding device is shown in FIGS. 1 and 2, it will be understood that a plurality of such holders may be mounted on the flotation device at any convenient location.

Figure 3:
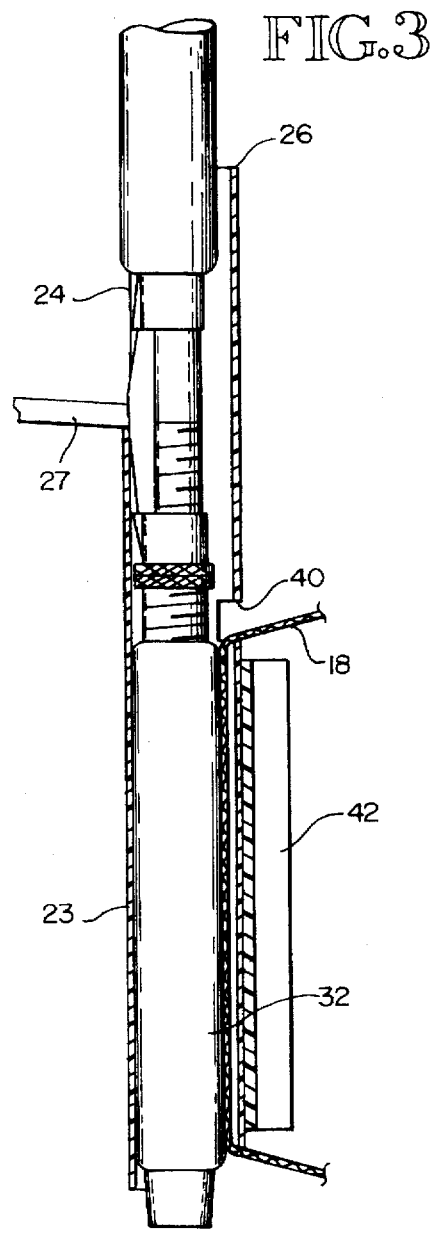
FIG. 3 is a partially sectioned view taken along lines 3—3 of FIG. 2.
Figure 4:
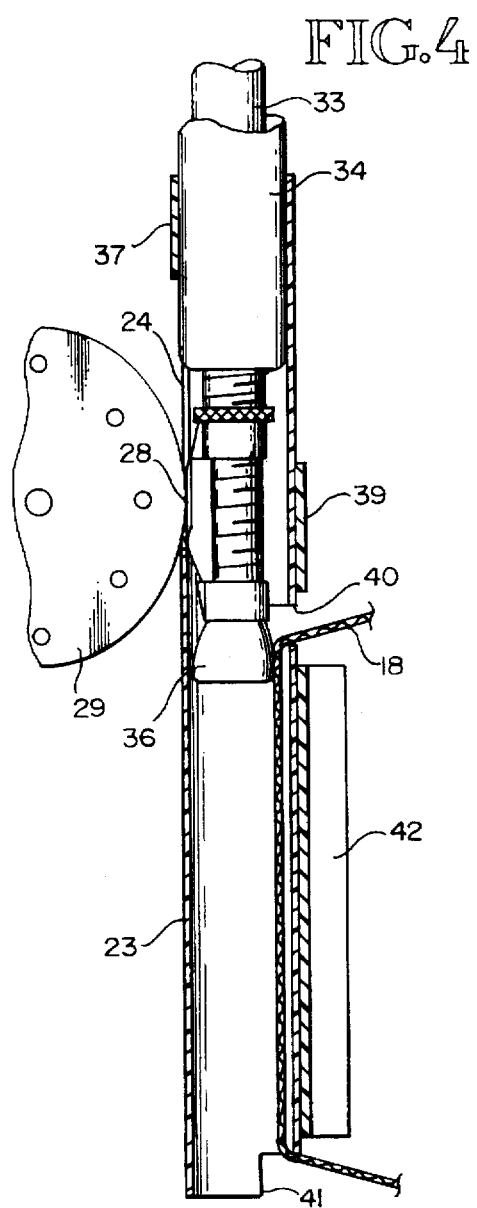
FIG. 4 is a cross sectional view similar to FIG. 3 with a fly rod and reel in stored position.

The body of the rod holder comprises an elongated tube 23 shown in FIGS. 1 and 2 and in cross section in FIGS. 3 and 4. Although the tube structure is identical in FIGS. 3 and 4, FIG. 3 illustrates the positioning of a conventional spinning reel and rod while FIG. 4 illustrates the mounting of a conventional fly rod and reel. The tube 23 may be made of any suitable material but plastic tubing is preferred, which may comprise injection molded units or commercially available PVC tubing. Although the tube may have an inside diameter ranging from 1-2 inches, such is not a limitation and the size of tubing will depend upon the fishing rod and reels to be accommodated. The length of the tube may also be varied somewhat but will be in the neighborhood of approximately 12 inches. A longitudinal slot 24 is cut, or formed by the molding process, into the wall of the tube 23 and extends from the upper rim 26 along a substantial portion of the upper half of the tube as shown in FIGS. 3 and 4. As will be understood, this slot is designed to receive either the stem 27 of a conventional spinning reel 22 as shown in FIGS. 1-3 or the connecting base 28 of a conventional bait casting or fly fishing reel 29 shown in FIGS. 4 and 8. For practical purposes the width of the slot usually will be in the neighborhood of approximately ½ inch in order to allow sufficient clearance for the reel stem or attaching means. The slot 24 may be angled or flared outwardly as at 31 for the purpose of guiding the reel and rod for initial movement into the holder. As will be appreciated from FIGS. 3 and 4, the extension of the tubing 23 above the bottom of the slot 24 serves to add stability to the rod as it rests in the holder. In the case of the fly rod and reel configuration shown in FIGS. 4 and 9, the extended upper reach of the holder tube 24 is especially important. Unlike the spinning rod 21, which includes a second elongated handle 32 on the terminal end of the rod beyond the reel, the fly rod 33 has its extended handle portion 34 located in front of the reel 29 and the rod terminates closely adjacent the opposite side of the reel at the butt portion 36.

Figure 5:
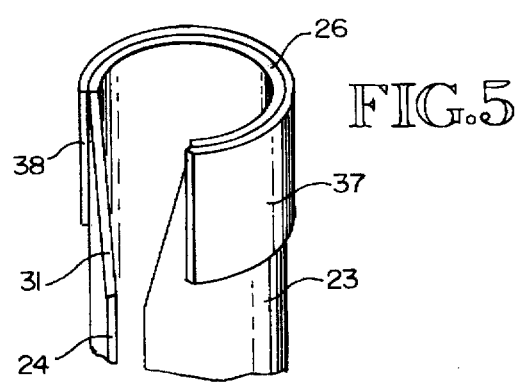
FIG. 5 is a detailed perspective view showing the lock ring in the open position mounted on the upper end of the holding tube.
Figure 6:
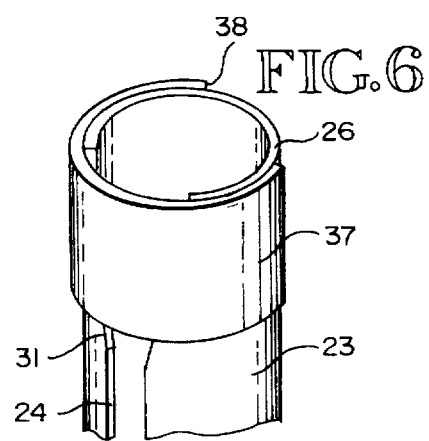
FIG. 6 is a perspective view similar to FIG. 5 with the lock ring in the closed position.
Figure 9:
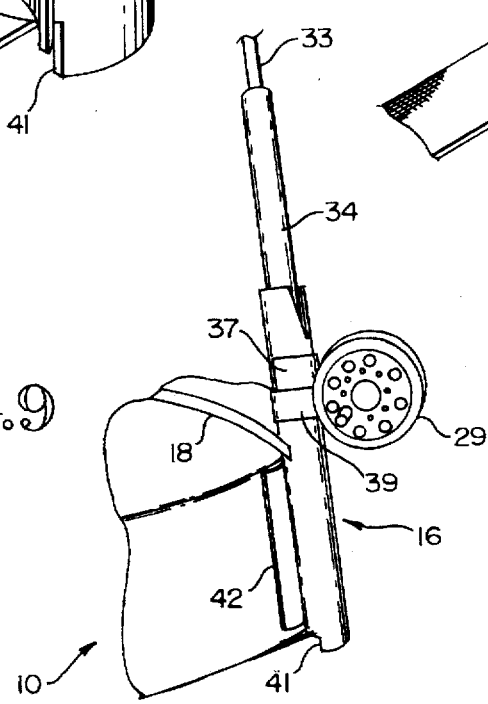
FIG. 9 is a perspective view of the fishing rod holder with a fly rod and reel therein.

Referring to FIG. 4, additional stability for the fly fishing rod may be provided by a lock ring 37 comprising a section of tubing having an inside diameter which matches the outside diameter of the tube 23. Here again, the lock ring is preferably a section of PVC tubing which will fit snugly on the surface of the tube 23. The lock ring 37 may be in the neighborhood of an inch in length and has the longitudinal slot 38 which is approximately the circumferential extent of the flared slot at the rim 26 of the tube 23. With this arrangement the lock ring 37 is positioned as shown in FIG. 5 for insertion of the rod and reel. Once the rod and reel are in place the ring 37 is moved to the closed position shown in FIG. 6. The lock ring 37 is then slid downwardly on the tube to rest against a fixed stop collar 39 as shown in FIG. 9.

The present invention provides for increased stability of the tube 23 in its mounting against the flotation device by means of passing the mounting strap 18 through a suitable transverse slot 40 in the approximate mid section of the tube and in the wall thereof diametrically opposed to the location of the slot 24. The placement of the slot 40 in the mid section of the tube 23 allows the tube to hold the reel portion of the fishing rod out of the water and readily convenient to the hand of the fisherman. Tube 23 may include a second slot or notch 41 at its lower end longitudinally aligned with the slot 40 to engage the strap 18 as it exits the tube and passes around the flotation device as shown in FIGS. 3 and 4. As will be appreciated by those familiar with the art, depending on the width and the rigidity of the strap 18, the placement of the strap within the slot 40 and notch 41 will prevent rotation of the tubular rod holder relative to the side of the flotation device.

In order to further enhance the action of the tightened web 18, an engagement plate or foot 42 is fixedly attached to the side of the tube 23 and extends longitudinally along the bottom portion of the tube which would otherwise engage the surface of the flotation device. The plate 42 is preferably formed from a segment of plastic tubing which is easily glued or otherwise attached to the surface of the tube 23. In the preferred embodiment, the plate 42 is arcuate whereby the edges 43 and 44 will contact and effectively grip the side of the flotation device by tightening of the belt 18. It will be understood, of course, that the configuration of the plate may be modified or, as an alternative, any means providing spaced parallel gripping edges or surfaces running longitudinally of the tube or other form of gripping surface will provide the desired function.

The passing of the strap 18 along a substantial portion if not the entire lower half of the inside surface of the tube 23, in addition to stabilizing the tube in the vertical position, also serves to provide a friction holding feature for the end of the fishing rod. As will be seen in FIG. 3, the entire end of portion 32 of the rod 21 is engaged with web 18 and, at least butt end 36 of the fly rod 33 may be engaged by the web 18. With this arrangement, there is no danger of the fishing rod being lost by tilting or overturning the flotation device and the rod is held steady in the holder.

Figure 7:
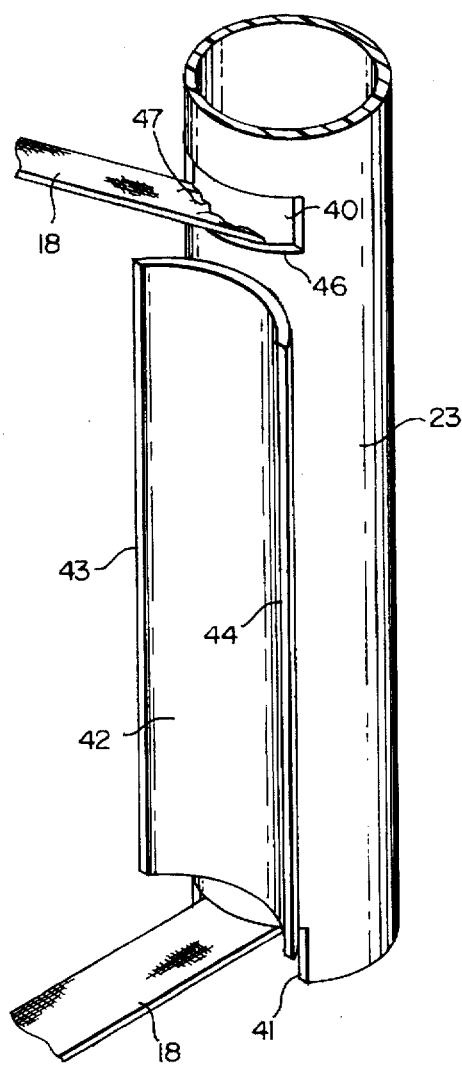
FIG. 7 is a perspective view of the lower half of the mounting tube illustrating one embodiment of the attachment strap slot.
Figure 8:
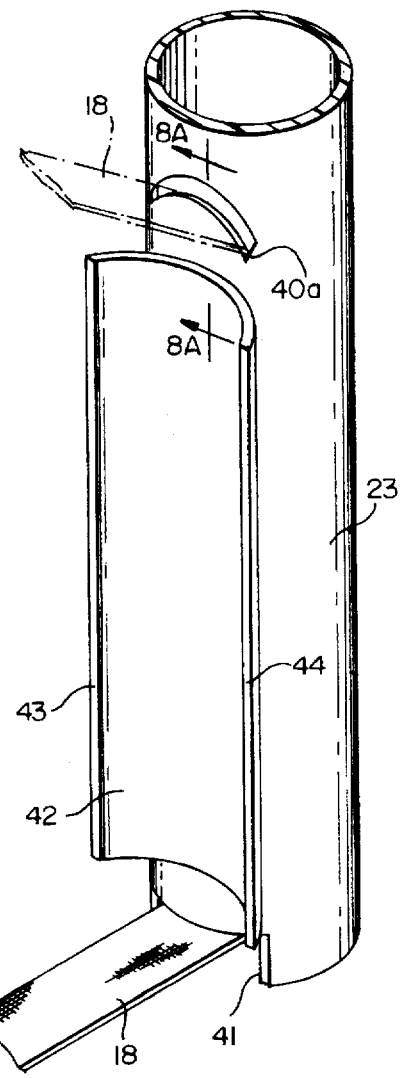
FIG. 8 is a perspective view of the lower half of the mounting tube showing a second embodiment of the mounting strap slot.
Figure 8A:
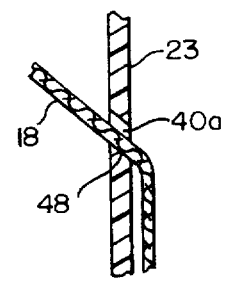
FIG. 8A is a partial cross section taken along lines 8a—8A of FIG. 8.

As previously described, transverse slot 40 allows for passage of the strap 18 into the interior of the tube. It will also be noted that a similar slot may be formed in the bottom end of the tube 23 instead of notch 41 without departing from the spirit of the invention. The circumferential extent of the slot 40 will preferably be equal to the width of the web 18 to prevent as much movement as possible. With the slot 40 having a straight bottom side in elevation as at 46 in FIG. 7, the strap 18 may exhibit some tendency to wrinkle and become more narrow in width as shown at 47 in FIG. 7. Although this may not be of general concern in some cases, FIG. 8 illustrates a modified form wherein the slot 40a is made arcuate in configuration which keeps the strap 18 spread and prevents the wrinkling effect. Additionally, as shown in FIG. 8A, slot 40a may be formed with the bottom edge 48 thereof at an angle so as to receive the strap 18 at an angle coincident with the angle of the strap at that point to avoid an abrupt edge over which the strap must pass. Although this angle may vary, it will normally be approximately 40° relative to the tube wall. This feature will also enhance the seating of the strap against the edge of the slot in a natural manner.

As will be appreciated by those familiar with the use of flotation devices and experienced in the use of both spinning rod and fly rod casting, the present invention provides a unique device for not only temporarily holding the rod and reel while a fish is being removed from the line or the tackle is changed, but also for storing additional rod and reel combinations while an alternate is being used. Normally either one or the other type of rod and reel is desirable but, in some situations both are equally appropriate. Also, some fishermen prefer to use separate rods for different types of tackle such as dry flies and wet flies or different type of lures or bait and thus may carry several poles at any given time. The present device provides an extremely stable and reliable holder for maintaining the stored rod or rods and reels above the water level in the stored position allowing the fisherman freedom with both hands to attend to other details. A provision for more tightly gripping the fishing rod within the holding tube gives added assurance that the rod and reel will not be lost because of unexpected movements of the flotation device.

Although a preferred embodiment of the invention has been shown and described herein with certain specific modifications, it is understood that the present disclosure is made by way of example and that various other embodiments and modifications are possible without departing from the inventive concept and are included within the scope of the following claims which claimed subject matter is regarded as the invention. The aim of the appended claims therefore, is to cover all such changes and modifications as fall within the true spirit and scope of the invention.

What is claimed is:

1. A fishing rod holding device comprising, in combination;

an elongated tubular body for receiving the handle of a fishing rod, attachment means for connecting said body to carrier in a substantially upright position, said attachment means including an elongated flexible member extending outside the rod holder to attach the holder to a user or other article and having a portion thereof extending longitudinally along the inside surface of a major portion of the tubular body for frictionally engaging a portion of the handle of said rod, whereby the rod is restrained against axial movement within said tubular body by said flexible member.

2. The device of claim 1 wherein;

said elongated flexible member comprises a strap extending longitudinally along the inside surface of said tubular body.

3. The device of claim 2 wherein said carrier comprises an inflatable flotation device, said flexible member extending about the body thereof, said combination further including;

a longitudinally extending contact plate fixed to the outside wall of said tubular body for contacting the surface of said flotation device, said contact plate including spaced longitudinal edges for enhancing the engagement between said tubular body and the surface of said flotation device.

4. The device of claim 3 wherein said contact plate comprises an elongated arcuate cross section member fixed to the tubular body along its longitudinal central axis, with the longitudinal edges thereof in contact with said flotation device.

5. The device of claim 1 wherein said tubular body has a top and bottom end in the upright position, said combination further including;

a first transverse circumferentially extending opening in the wall of said tubular body spaced from said top end, and a second transverse circumferentially extending opening adjacent the bottom end of the tubular body in longitudinal alignment with said first opening, said elongated flexible attachment member passing through said first opening, downwardly along the inside surface of said tubular body in frictional contact with the handle of said rod and outwardly through said second opening.

6. A rod holding device for holding a fishing rod in a stored position comprising, in combination;

an elongated tubular body including an open end defining a top end for receiving the handle of a fishing rod for limited axial movement therein, and a bottom end opposite thereof, an attachment structure for connecting said body to a carrier in a substantially upright fixed position relative to the carrier, said attachment structure contacting said body at a first contact point adjacent the midpoint thereof and a second contact point adjacent said bottom end, the handle of said fishing rod extending within said body beyond said first contact point, and said attachment structure includes an elongated flexible member extending outside the rod holder to attach the holder to a user or other article and having a portion thereof extending longitudinally along the inside surface of a major portion of the tubular body between said first and second contact points for engaging a portion of the handle of said rod, whereby said attachment structure prevents rotational movement between the rod holding device and the carrier and the rod is restrained against axial movement within said tubular body by said flexible member.

7. The device of claim 6 wherein;

said elongated flexible member comprises a strap extending longitudinally along the inside surface of said tubular body.

8. The device of claim 7 wherein said carrier comprises an inflatable flotation device, said flexible member extending about the body thereof, said combination further including;

a longitudinally extending contact plate fixed to the outside wall of said tubular body for contacting the surface of said flotation device, said contact plate including spaced longitudinal edges for enhancing the engagement between said tubular body and the surface of said flotation device.

9. The device of claim 8 wherein said contact plate comprises an elongated arcuate cross section member fixed to the tubular body along its longitudinal central axis, with the longitudinal edges thereof in contact with said flotation device.

10. The device of claim 6, said combination further including;

a first transverse circumferentially extending opening in the wall of said tubular body spaced from said top end, and a second transverse circumferentially extending opening adjacent the bottom end of the tubular body in longitudinal alignment with said first opening, said elongated flexible attachment member passing through said first opening, downwardly along the inside surface of said tubular body in frictional contact with the handle of said rod and outwardly through said second opening.

11. A device for holding a fishing rod and attached reel in a stored position, said reel being attached to said rod by connecting means therebetween at a position spaced from the terminal butt end of the rod and having at least one handle adjacent said reel remote from the butt end of the rod, comprising in combination;

an elongated tubular body having an open end defining the top end of the body for receiving the butt end of the rod, an axially directed longitudinal slot in the wall of said body extending from said top end a substantial portion of the length of the body and having a bottom end adjacent the area of the mid point of said body, said slot being configured so as to allow passage of the connecting means between the reel and rod whereby the rod is prevented from rotation relative to the body and axial movement of the rod is limited by the bottom end of the slot, the portion of the body between the bottom of the slot and said top end extending over said at least one handle on the rod and the balance of the body extending over substantially the full length of the butt end of the rod beyond said reel, whereby said handle and butt end of the rod are confined within said tube in the stored position.

12. The device of claim 11 including;

attachment means for connecting said body to a carrier in a substantially upright position, said attachment means including an elongated flexible member having a portion thereof located on the inside surface of a major portion of the tubular body for frictionally engaging substantially the full length of the butt end of the rod beyond said reel, whereby the rod is restrained against axial movement within said tubular body by said flexible member.

13. The device according to claim 12 wherein said carrier comprises an inflatable flotation device, said flexible attachment member extending about the body thereof, said combination including;

a longitudinally extending contact plate fixed to the outside wall of said tubular body for contacting the surface of said flotation device, said contact plate including spaced longitudinal edges for enhancing the engagement between said tubular body and the surface of said flotation device.

14. The device of claim 13 wherein said contact plate comprises an elongated arcuate cross section member fixed to the tubular body along its longitudinal central axis, with the longitudinal edges thereof in contact with said flotation device.

15. The device of claim 12 including;

a lock ring located on the outside surface of the tubular body and mounted for axial and rotational movement relative thereto, said lock ring including a circumferential opening extending the full axial length thereof and capable of being rotated between a first position axially aligned with said slot to allow passage of the connecting means between the reel and rod and a second position to block passage of the connecting means.

16. The device of claim 15 wherein said slot has a uniform width over the major portion thereof and a gradually widened configuration adjacent the top end of the tubular body to facilitate insertion of the fishing rod within the body, the opening in said lock ring being equal to the circumferential extent of the width of said slot at the top end of said tubular body.

17. The device of claim 16 including;

a first transverse circumferentially extending opening in the wall of said tubular body located diametrically opposite said longitudinal slot at the approximate longitudinal mid portion of said tubular body, and a second transverse circumferential extending opening adjacent the bottom end of the tubular body, said elongated flexible attachment member passing through said first transverse opening, downwardly along the inside surface of said tubular body in frictional contact with the butt end of said rod and outwardly through said second transverse opening.

18. The device of claim 10 wherein said first transverse opening is generally arcuate in vertical elevation.

19. The device of claim 18 wherein said first transverse opening includes;

a bottom arcuate edge surface formed in the wall of said tubular body, said bottom arcuate edge surface being angled inwardly and downwardly to conform to the angle of said flexible attachment member as it enters the tubular body.

20. The device of claim 17 wherein said carrier comprises an inflatable flotation device, said flexible attachment member extending about the body thereof, said combination including;

a longitudinally extending contact means located in fixed relation to the outside wall of said tubular body for contacting the surface of said flotation device, said contact means including contact surface means for enhancing the engagement between said tubular body and the surface of said flotation device.

21. The device of claim 20 wherein said contact means comprises an elongated arcuate cross section member fixed to the tubular body along its longitudinal central axis, with the longitudinal edges thereof in contact with said flotation device.

* * * * *